(12) United States Patent
Le

(10) Patent No.: US 10,602,586 B2
(45) Date of Patent: Mar. 24, 2020

(54) STANDBY POWER CONSUMPTION CONTROL DEVICE FOR LIGHTING SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Zai Le, Zhejiang (CN)

(73) Assignee: Self Electronics Co., Ltd., Ningbo (CN)

(*) Notice: Subject to any disclaimer, the term of this patent is extended or adjusted under 35 U.S.C. 154(b) by 0 days.

(21) Appl. No.: 16/450,611

(22) Filed: Jun. 24, 2019

(65) Prior Publication Data
US 2020/0015338 A1 Jan. 9, 2020

(30) Foreign Application Priority Data
Jul. 4, 2018 (CN) .......................... 2018 1 0727446

(51) Int. Cl.
*H05B 37/02* (2006.01)
*H02M 5/458* (2006.01)
*H02M 1/42* (2007.01)

(52) U.S. Cl.
CPC ...... *H05B 37/0209* (2013.01); *H02M 1/4208* (2013.01); *H02M 5/458* (2013.01); *H02M 1/4225* (2013.01); *H02M 1/4266* (2013.01)

(58) Field of Classification Search
CPC . H02M 1/4208; H02M 1/4266; H02M 1/4225
USPC ................................. 315/247, 276, 283, 291
See application file for complete search history.

(56) References Cited

U.S. PATENT DOCUMENTS

| 2005/0128773 A1* | 6/2005 | Yang | H02M 1/4208 363/21.01 |
| 2006/0013026 A1* | 1/2006 | Frank | H02M 1/4225 363/89 |

* cited by examiner

*Primary Examiner* — Thuy V Tran
(74) *Attorney, Agent, or Firm* — Wang Law Firm, Inc.

(57) ABSTRACT

A standby power consumption control device for a lighting system, includes a power factor correction module; first functional module for assisting in improving a power factor, the first functional module being located at an output end of a rectifier module of the lighting system and electrically connected to the power factor correction module; second functional module for assisting in improving a power factor, the second functional module being electrically connected to an output end of the power factor correction module; and a control module electrically connected to the first functional module, the second functional module, and the power factor correction module; the control module can control the first functional module, the second functional module, and the power factor correction module to be synchronously turned on or off according to a working state of the lighting system.

6 Claims, 1 Drawing Sheet

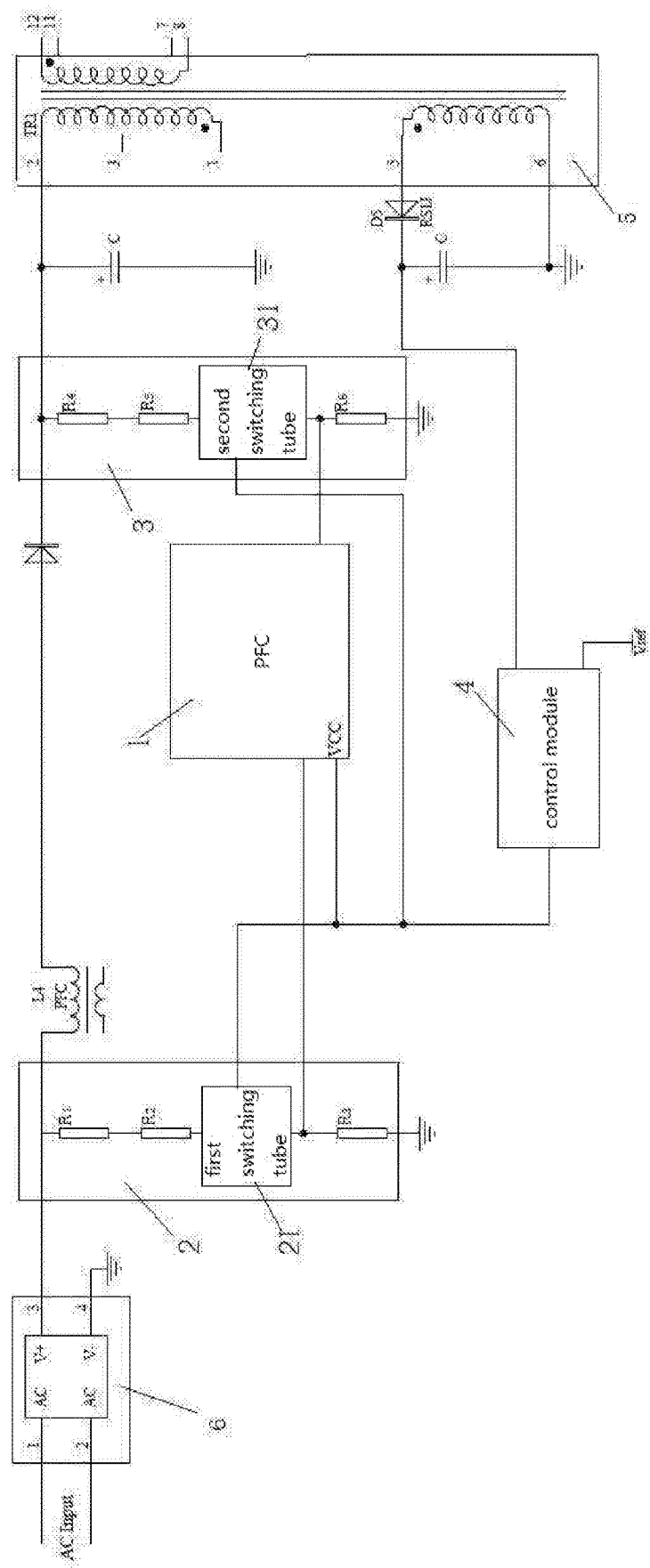

STANDBY POWER CONSUMPTION CONTROL DEVICE FOR LIGHTING SYSTEM

RELATED APPLICATION

This application claims priority to a Chinese Patent Application No. CN 201810727446.2, filed on Jul. 4, 2018.

FIELD OF THE TECHNOLOGY

The present invention relates to electronic equipment field, with particular emphasis on a standby power consumption control device for lighting system.

BACKGROUND OF THE INVENTION

Due to problems such as power output loss, the effective power actually used in the lighting system is not high. In order to improve the effective utilization of electricity, researchers usually set power factor correction circuits at the front end of the lighting system to improve the power factor. Such power factor correction circuits are also widely used due to their simple structure, mature technology, high cost performance and high versatility.

However, the lighting system using the power factor correction circuit mentioned above has the problem that the standby power consumption of the whole lighting control component cannot meet the ERP standard because the power factor correction circuit is difficult to shut down when the lighting control component is in standby state.

The main reason is that, in order to obtain high power factor, existing active power factor correction circuits generally have the resistors that output the positive pole to the ground in the rectifier circuit and the resistors that output the ground in the power factor correction circuit. As long as the rectifier circuit has output voltage, these resistors will have real-time power loss regardless of whether the power factor correction circuit is working, which leads to excessive standby power consumption of the lighting system.

BRIEF SUMMARY OF THE INVENTION

Therefore, the present invention provides a standby power consumption control device for lighting system that can effectively reduce standby power consumption of a lighting system.

In order to achieve the above object, the technical solution adopted by the present invention is: a standby power consumption control device for lighting system, the standby power consumption control device comprising
power factor correction module;
first functional module for assisting in improving a power factor, the first functional module being located at an output end of a rectifier module of the lighting system and electrically connected to the power factor correction module;
second functional module for assisting in improving a power factor, the second functional module being electrically connected to an output end of the power factor correction module;
characterized in that:
the standby power consumption control device further comprising a control module electrically connected to the first functional module, the second functional module, and the power factor correction module;
the control module controls the first functional module, the second functional module, and the power factor correction module to be synchronously turned on or off according to a working state of the lighting system.

Advantageously, a first switching tube is disposed in the first functional module, and a second switching tube is disposed in the second functional module;
the output end of the control module is electrically connected to driving poles of the first and second switching tubes and the power end of the power factor correction module;
the first and second switching tubes and the power factor correction module are simultaneously turned on or off according to an output signal of the control module, thereby realizing synchronous control of the first functional module and the second functional module and the power factor correction module.

Advantageously, the control module is composed of a comparator, a first input end of the control module is connected to a transformer at the rear end of the power factor correction module to obtain a comparison value, and a second input of the control module is used to set a reference value; the reference value is selected according to electrical information at a connection between the first input end and the transformer in different working states of the lighting system; the comparison value is different depending on the working state of the lighting system.

Advantageously, the first switching tube and the second switching tube are triodes or MOS tubes.

Advantageously, the first functional module is a load module for outputting a positive pole to the ground of the rectifier module;
the second functional module is a resistor module for outputting the power factor correction module to the ground.

Advantageously, the control module is a voltage comparator, and the comparison result is a high or low level signal.

the standby power consumption control method for lighting system comprises:
step S1: the control module obtains the comparison value, compares the comparison value with the reference value, and outputs a comparison result;
step S2: the first switching tube, the second switching tube, and the power factor correction module simultaneously turn on or off according to the comparison result, so that the first functional module, the second functional module, and the power factor correction module are synchronously turned on or off.

the step S2 specifically includes: if the lighting system is in the working state, the comparison value is greater than the reference value, the control module outputs a high level, and the first and second switching tubes and the power factor correction module are all driven to be turned on, the first and second functional modules and the power factor correction module is turned on;
if the lighting system does not work, the comparison value is less than the reference value, the control module outputs a low level, the first and second switching tubes and the power factor correction module are turned off, and the first and second functional modules and the power factor correction module stop working.

Compared with the prior art, the invention has the advantages that: the control module is arranged in the lighting control part, switching tubes are arranged for the first functional module and the second functional module, and the drive pole of the switching tube and the power supply end of the power factor correction module are controlled by the output end of the control module. When the output end of the control module outputs a high level, the switching tube is driven to conduct, and the power factor correction module is also turned on, thus, the first functional module, the second functional module and the power factor correction module can be switched on and in working state when the lighting system is in working state; when the output end of the control module outputs low level, the switching tube is turned off, and the power factor correction module stops working due to insufficient driving force, in this way, the power factor correction module, the first function module and the second function module can be simultaneously shut down and not work when the lighting system is in non-working state, thereby reducing power consumption loss of the control component when the lighting system is in a standby state.

BRIEF DESCRIPTION OF THE DRAWINGS

The drawings described herein are intended to promote a further understanding of the present invention, as follows:

The FIGURE is a schematic structural diagram of an embodiment of a standby power consumption control device according to the present invention.

DETAILED DESCRIPTION OF THE INVENTION

The present application is illustrated by way of the following detailed description based on of the accompanying drawings. It should be noted that illustration to the embodiment in this application is not intended to limit the invention.

The FIGURE shows an embodiment of a standby power consumption control device applied for lighting system in the present application. The standby power consumption control device includes power factor correction module 1, first functional module 2 at the output end of a rectifier module 6 for assisting in improving the power factor, the first functional module 2 is electrically connected with the power factor correction module 1, and second functional module 3 which is electrically connected with the output end of power factor correction module 1 to assist in improving the power factor. In the present application, the power factor correction module is PFC control chip. It should be noted that the lighting system has a variety of timing sequence start types, such as device wake-up starts in the order of power supply—rectification—power factor correction—load, or it can be started according to the sequence of power supply—rectification—load—power factor correction. This present application mainly corresponds to the latter timing sequence operation mode. The functions of the present application are also completed on the basis of this timing sequence operation mode. At the same time, the lighting system timing sequence startup type belongs to the common knowledge in the field, so it would not be described in detail here.

In order to ensure that the first functional module, the second functional module and the power factor correction module are in normal working when the lighting system is working, and when the lighting system is not working, that is, in the standby state, the first functional module and the second functional module and the power factor correction module can also stop working and reduce power consumption. A control module 4 is set in the lighting control part in this application, the output end of the control module 4 is connected with the first functional module 2, the second functional module 3, and the power factor correction module 1. The control module 4 controls the opening or closing of the first functional module 2, the second functional module 3, and the power factor correction module 4 according to the working state of the lighting system, and all three can change in the same way according to the control of the control module 4.

In order to effectively control the synchronization of the three, switching tubes 21 and 31 are respectively arranged in the first functional module 2 and the second functional module 3, and the output ends of the control module 4 is connected with the driving pole of the two switching tubes 21 and 31 and the power end of the power factor correction module 1. The first functional module, the second functional module and the power factor correction module are controlled by controlling the on-off of the two switching tubes and the driving of the power end of the power factor correction module.

At the same time, in order to enable the opening and closing of the first functional module, the second functional module, and the power factor correction module to change according to the working state of the lighting system, the input end of the control module 4 is connected to the transformer 5 at the back end of the power factor correction module. Under different working conditions, the voltage at point A of the transformer is different. For example, the voltage at point A is relatively low at standby time, which is 10V. When loaded, the voltage at point A is relatively high, which is 20V. The control module 4 can output different electrical signals to the first switching tube 21, the second switching tube 31 and the power end of the power factor correction module 4 according to the change of the voltage value at this point, and the three will perform the same operation reaction after obtaining the electric signal, and the operation reaction consistent with lighting system's working state at this time.

In this embodiment, the control module 4 is a voltage comparator, and the first input end of the voltage comparator is connected to one winding of the transformer. It is conceivable that the two may be directly connected or may be connected through a voltage stabilizing line. the second input end is used for setting the comparison reference voltage, and the setting of the reference voltage can be selected according to the high and low voltage ranges of the point A, that is, the magnitude of the reference voltage value is between the voltage value at point A when it is loaded and the voltage value at point A when it is standby. The voltage value of the point A is used instead of the working state of the lighting system, and is compared with the reference voltage. The specific control process is as follows:

When the system is working, the voltage value at point A is high. After comparison, the voltage value at point A is higher than the reference voltage; the voltage comparator outputs a high level, the driving pole of the first switching tube 21, the driving pole of the second switching tube 31, and the power end of the power factor correction module 4 is driven to be turned on due to obtaining the high level, so that the first functional module 2, the second functional module 3, and the power factor correction module 4 are turned on, that is, the three are in working state, which matches the working state of the current lighting system.

When the system is not working, the voltage value at point A is low. After comparison, the voltage value at point A is lower than the reference voltage, the voltage comparator outputs a low level. The first switching tube 21, the second switching tube 31, and the power end of the power factor correction module 4 is closed due to insufficient voltage, so that the first functional module 2, the second functional module 3, and the power factor correction module 4 are also turned off, thus, power loss caused by the output voltage of the rectifier module 6 is prevented.

It should be noted that only the state transformation of the first switching tube, the second switching tube and the power factor correction module is directly based on the output information of the comparator itself, but this does not mean that only this method can be used. For the purpose of the present invention, other embodiments may be used. For example, due to different types of comparators selected and different choices of reference voltage and comparison value, the comparator outputs low level when the lighting system is in working state. At this point, if the first switching tube, the second switching tube and the power factor correction module are also required to follow the overall state of the lighting system, the problem can be solved by adding a phase inverter at the output end of the comparator, for example. that is, When the lighting system is working and the comparator outputs a low level, the output low level is reversed by the phase inverter and becomes high level, and the first switching tube, the second switching tube, and the power factor correction module can also get the high level trigger signal and turn on, and when the lighting is not working as a whole, the comparator outputs a high level, which is reversed by the phase inverter to a low level, at this time, the first switching tube, a second switching tube and a power factor correction module can also get the turn-off signal, that is, the low level, then all do not conduct, to follow the operating state of the lighting system synchronously. Therefore, in this application, the output result of the comparator should be broadly understood, which not only includes the output information of the comparator itself, but also includes the result information connected with the output end of the comparator to finally output and apply to the first switching tube, the second switching tube and the power factor correction module.

At the same time, the current comparator and other devices with comparison function can also be used here to achieve the same purpose mentioned above. The first switching tube 21 and the second switching tube 31 may be switching devices such as a triode or a MOS transistor. The first functional module 2 is a load module for outputting the positive pole to the ground of the rectifier module 6, that is, it is the branch of resistance R1 to R3 connected to the positive pole of rectifier module 6, and the second functional module 3 is a resistor module for outputting the power factor correction module to the ground, that is, it is the branch of resistance R4 to R6, which is connected to the output end of PFC, which is a prior art and will not be described herein.

the standby power consumption control method for lighting system comprises:

step S1: the comparator obtains the comparison value, compares the comparison value with the reference value, and outputs a comparison result;

step S2, the first switching tube, the second switching tube, and the power factor correction module simultaneously turn on or off according to the comparison result, so that the first functional module, the second functional module, and the power factor correction module are synchronously turned on or off.

the step S2 specifically includes: if the lighting system is in the working state, the comparison value is greater than the reference value, the comparator outputs a high level, and the first and second switching tubes and the power factor correction module are all driven to be turned on, the first and second functional modules and the power factor correction module is turned on;

if the lighting system does not work, the comparison value is less than the reference value, the comparator outputs a low level, the first and second switching tubes and the power factor correction module are turned off, and the first and second functional modules and the power factor correction module stop working.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A standby power consumption control device for lighting system, the standby power consumption control device comprising
    power factor correction module (1);
    first functional module (2) for assisting in improving a power factor, the first functional module (2) being located at an output end of a rectifier module (6) of the lighting system and electrically connected to the power factor correction module (1);
    second functional module (3) for assisting in improving a power factor, the second functional module (3) being electrically connected to an output end of the power factor correction module (1);
    characterized in that:
    the standby power consumption control device further comprising a control module (4) electrically connected to the first functional module (2), the second functional module (3), and the power factor correction module (1);
    the control module (4) controls the first functional module (2), the second functional module (3), and the power factor correction module (1) to be synchronously turned on or off according to a working state of the lighting system.

2. The standby power consumption control device for lighting system as claimed in claim 1, wherein a first switching tube (21) is disposed in the first functional module (2), and a second switching tube (31) is disposed in the second functional module (3);
    the output end of the control module (4) is electrically connected to driving poles of the first and second switching tubes (21, 31) and the power end of the power factor correction module (4);
    the first and second switching tubes (21, 31) and the power factor correction module (4) are simultaneously turned on or off according to an output signal of the control module (4), thereby realizing synchronous control of the first functional module (2) and the second functional module (3) and the power factor correction module (1).

3. The standby power consumption control device for lighting system as claimed in claim 2, wherein the first switching tube (21) and the second switching tube (31) are triodes or MOS tubes.

4. The standby power consumption control device for lighting system as claimed in claim 1, wherein the control module (4) is composed of a comparator, a first input end of the control module (4) is connected to a transformer (5) at the rear end of the power factor correction module (1) to obtain a comparison value, and a second input of the control module (4) is used to set a reference value;

the reference value is selected according to electrical information at a connection between the first input end and the transformer in different working states of the lighting system;

the comparison value is different depending on the working state of the lighting system.

5. The standby power consumption control device for lighting system as claimed in claim 4, wherein the control module (4) is a voltage comparator, and the comparison result is a high or low level signal.

6. The standby power consumption control device for lighting system as claimed in claim 1, wherein the first functional module (2) is a load module for outputting a positive pole to the ground of the rectifier module;

the second functional module (3) is a resistor module for outputting the power factor correction module to the ground.

\* \* \* \* \*